(12) United States Patent
Rashidi et al.

(10) Patent No.: US 11,258,253 B2
(45) Date of Patent: Feb. 22, 2022

(54) POWER SHARING OF PARALLEL DC SOURCES

(71) Applicant: Eaton Intelligent Power Limited, Dublin (IE)

(72) Inventors: Mohammad Rashidi, Milwaukee, WI (US); Mehdy Khayamy, Milwaukee, WI (US); Richard Fons, Milwaukee, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/024,818

(22) Filed: Sep. 18, 2020

(65) Prior Publication Data

US 2021/0091564 A1 Mar. 25, 2021

Related U.S. Application Data

(60) Provisional application No. 62/903,449, filed on Sep. 20, 2019.

(51) Int. Cl.
*H02J 1/10* (2006.01)
*B64D 41/00* (2006.01)
*H02J 1/12* (2006.01)

(52) U.S. Cl.
CPC .............. *H02J 1/106* (2020.01); *B64D 41/00* (2013.01); *H02J 1/12* (2013.01); *B64D 2221/00* (2013.01); *H02J 2310/44* (2020.01)

(58) Field of Classification Search
CPC .......... H02J 1/106; H02J 1/12; H02J 2310/44; H02J 1/102; B64D 41/00; B64D 2221/00
See application file for complete search history.

(56) References Cited

U.S. PATENT DOCUMENTS

| 2007/0248877 A1* | 10/2007 | Qahoug | H02J 3/46 429/121 |
|---|---|---|---|
| 2009/0224599 A1 | 9/2009 | Yue et al. | |
| 2014/0167516 A1 | 6/2014 | Gataric et al. | |

(Continued)

FOREIGN PATENT DOCUMENTS

CN 110224388 A 9/2019

OTHER PUBLICATIONS

European Search Report for Application No. 20196783.3, dated Nov. 26, 2020, 9 pages.

*Primary Examiner* — Daniel Cavallari
(74) *Attorney, Agent, or Firm* — Merchant & Gould P.C.

(57) ABSTRACT

A control scheme for controlling power sharing among a plurality of parallel connected DC voltage sources is disclosed. Each of the DC voltage sources in parallel connection is an independent DC power system, which can be an suitable DC power supply that can provide power to a load. By way of example, the present disclosure describes a DC power system that includes a power source, an energy storage unit and a triple active bridge converter that provides power to the common load. Each independent DC power system has its own controller that shares a DC bus with the other DC power system controllers. Each controller executes non-transitory instructions to provide a reference voltage V* to its respective independent DC power system and implements a control scheme that changes the voltage reference to ensure that each independent DC power system only provides a certain share of the load current/power.

13 Claims, 3 Drawing Sheets

(56) References Cited

U.S. PATENT DOCUMENTS

2014/0300192 A1* 10/2014 Price .................. H02J 9/04
307/53
2018/0090984 A1 3/2018 Ku et al.

* cited by examiner

POWER SHARING OF PARALLEL DC SOURCES

BACKGROUND

Hybrid-Electric and all-electric aircraft are increasingly becoming more relevant in the aerospace industry. To optimize the design of these new air vehicles, high voltage and high current electrical systems are being introduced into new models. Various voltages are being proposed for future aircraft, ranging from 230 V AC to 1000 V DC and above. An efficient and effective energy and power management is needed to optimize operation of these aircraft electrical systems and to optimize operation of any electrical system that may utilized parallel connected DC voltage sources.

SUMMARY

The present disclosure is directed to devices, systems and methods for implementing a control scheme for controlling power sharing among a plurality of parallel connected DC voltage sources.

In certain aspects, the present disclosure is directed to a method for controlling power sharing among at least two DC power systems connected in parallel and powering an electrical load. The method includes determining an operating parameter of each of the at least two DC power systems connected in parallel as well as determining an amount of power needed to power the electrical load. The method further includes determining a division of power among the at least two DC power systems and assigning a percentage of power to be supplied by each of the at least two DC power systems. The division of power among the DC power systems is based on the operating parameter of each of the DC power systems and on the amount of power needed to power the electrical load. The method further includes independently supplying, for each one of the at least two DC power systems, a reference voltage, each reference voltage for each one of the at least two DC power systems having a voltage level that enables each one of the at least two DC power systems to produce only their respective assigned percentage of power.

In certain aspects the present disclosure is directed to a system for controlling power sharing among DC power systems connected in parallel and powering an electrical load. The system includes a first DC power system controlled by a first controller, a second DC power system controlled by a second controller that is distinct from the first controller and an electrical load powered by the first DC power system and the second DC power system. The first and second controllers share a common DC bus. The first and second DC power systems are connected in parallel and each of the first and second DC power systems are assigned a percentage of power (e.g., a DC set point voltage) to produce to power the electrical load. The first controller supplies a first reference voltage to the first DC power system. The first reference voltage is used by the first DC power system to produce only the percentage of power assigned to it. The second controller supplies a second reference voltage to the second DC power system. The second reference voltage is used by the second DC power system to produce only the percentage of power assigned to it.

In certain aspects, the present disclosure is directed to a controller executing non-transitory instructions to control a first DC power system that is connected in parallel to a second DC power system controlled by a separate controller. The controller and the separate controller share a DC bus. The first DC power system and the second DC power system have each been assigned a percentage of power (e.g., a DC voltage set point) to produce to power an electrical load. The non-transitory instructions cause the controller to supply a reference voltage sufficient to enable the first DC power system to produce only its assigned percentage of power. The non-transitory instructions further cause the controller to fine tune a balance between controlling the reference voltage to a specific voltage level and enabling the first DC power system to produce only the percentage of power assigned to the first DC power system through use of an adjustable operating parameter.

BRIEF DESCRIPTION OF THE DRAWINGS

Non-limiting and non-exhaustive examples are described with reference to the following Figures.

DETAILED DESCRIPTION

Figure 1:
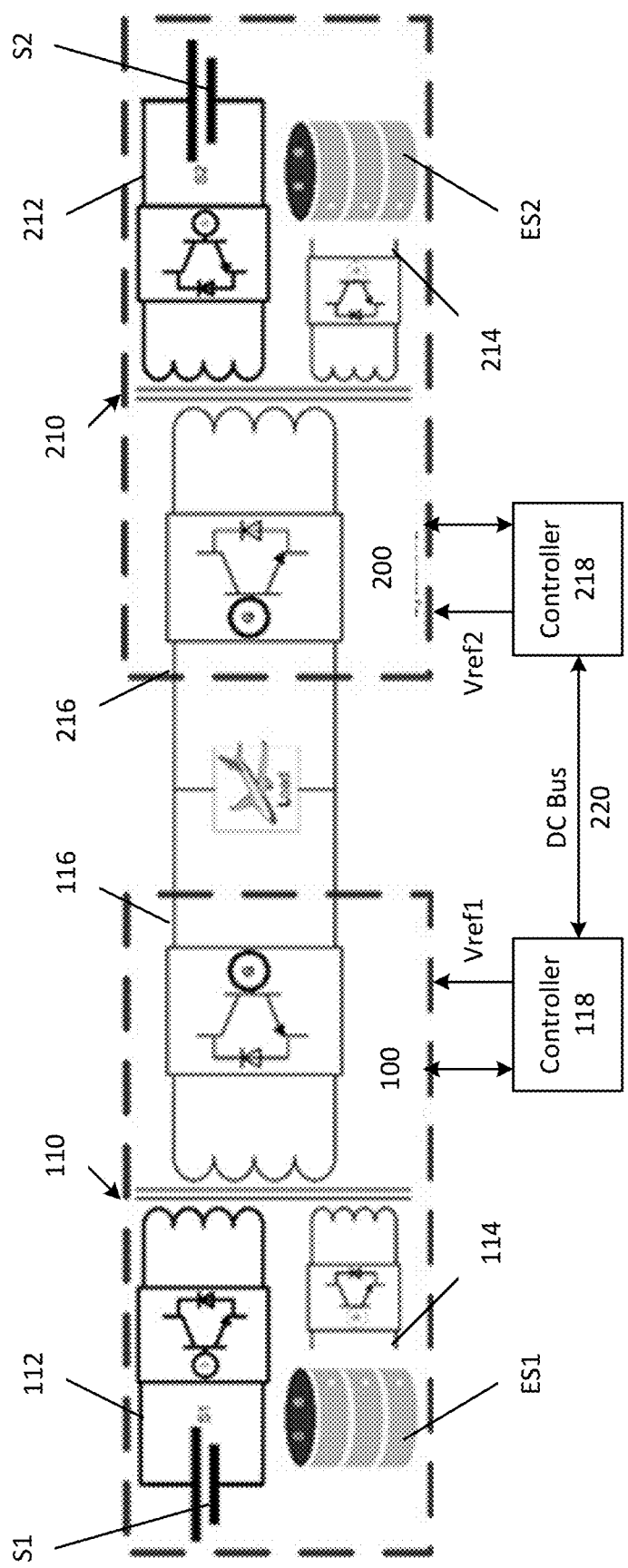
FIG. 1 illustrates a parallel connection of a first DC voltage system and a second DC voltage system for powering a load.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The present disclosure is directed to a control scheme for controlling power sharing among a plurality of parallel connected DC voltage sources. Each of the DC voltage sources in parallel connection is an independent DC power system, which can be an suitable DC power supply that can provide power to a load. By way of example, the present disclosure describes a DC power system that includes a power source, an energy storage unit and a triple active bridge converter that provides power to the common load. Each independent DC power system has its own controller that shares a DC bus with the other DC power system controllers. Each controller executes non-transitory instructions to provide a reference voltage V* to its respective independent DC power system and implements a control scheme that changes the voltage reference to ensure that each independent DC power system only provides a certain share of the load current/power. In certain embodiments, the load powered by the plurality of parallel connected DC voltages is one or more of an electrically powered engine/motor, a hybrid (electric-gas) powered engine and/or other electrical components of an aircraft. In certain embodiments, the load is non-aircraft related.

Referring to FIG. 1, a schematic illustrating the parallel connection of a first independent DC power system 100 and a second independent DC power system 200 supplying DC power to a load 10. The load 10, in this case, is an aircraft having one or more of an electrically powered engine, a hybrid (electric-gas) powered engine and/or other electrical components.

The first independent DC power system 100 includes a triple active bridge converter 110 that has two input ports and an output port. The first input port 112 is electrically coupled to a DC power source S1 (e.g., a generator) and the second input port 114 is electrically coupled to a DC energy storage unit ES1 (e.g., a battery). The output port 116 is electrically coupled to the load 10. It should be noted that while the first independent DC power system is illustrated as having one power source and one energy storage unit, in other configurations, the first independent DC power system may, alternatively, utilize a first power source at the first input port 112 and a second power source at the second input port 114 or utilize a first energy storage unit at the first input port 112 and a second energy storage unit at the second input port 114. Further, the DC power system 100 is not limited to the triple active bridge converter 110 but may actually comprise any suitable DC supply and any suitable rectifier. A first controller 118 is electrically and communicatively coupled to the first independent DC power system 100 and controls a first reference voltage V* (see Eq. (1) below) that is provided to the independent DC power system 100.

Similarly, the second independent DC power system 200 includes a triple active bridge converter 210 that has two input ports and an output port. The first input port 212 is electrically coupled to a power source S2 (e.g., a generator) and the second input port 214 is electrically coupled to an energy storage unit ES2 (e.g., a battery). The output port 216 is electrically coupled to the load 10. It should be noted that while the second independent DC power system is illustrated as having one power source and one energy storage unit, in other configurations, the second independent DC power system may, alternatively, utilize a first power source at the first input port 212 and a second power source at the second input port 214 or utilize a first energy storage unit at the first input port 212 and a second energy storage unit at the second input port 214. Further, the DC power system 200 is not limited to the triple active bridge converter 210 but may actually comprise any suitable DC source and any suitable rectifier. A second controller 218 is electrically and communicatively coupled to the second independent DC power system 200 and controls a second reference voltage V* (see Eq. (1) below) that is provided to the independent DC power system 200. The second controller 218 shares a common DC bus 220 with the first controller 118.

Figure 2:
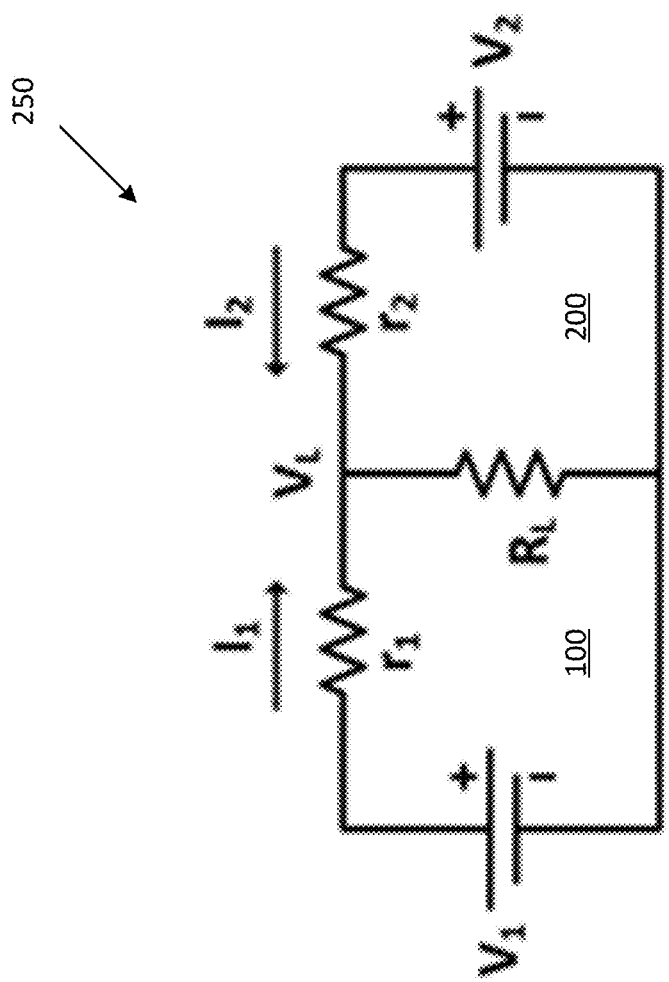
FIG. 2 illustrates simplified circuitry of the parallel configuration of FIG. 1.

When the first independent DC power system 100 is in parallel with the second independent DC power system 200 each of the systems 100, 200 contributes to feeding the load. FIG. 2 provides a simplified circuit 250 illustrating this concept with controllers 118, 218 removed. In the circuit 250, the first independent DC power system 100 is represented by voltage source $V_1$ and resistor $R_1$ with current Ii flowing toward the load; $V_L$ represents the voltage applied to the load. The second independent DC power system 200 is represented by voltage source $V_2$ and resistor $R_2$ with current $I_2$ flowing toward the load $V_L$. A resistor $R_L$ represents the load impedance. Notably, without a controller controlling and providing a reference voltage to each of the systems 100, 200, each of which is operating in a voltage regulation mode, one of the systems 100, 200 might provide most of the power while the other contributes less due to unsymmetrical parameters of the systems 100.

However, utilizing each of the controllers 118, 218 (see FIG. 1) and the control scheme of the present disclosure to control the reference voltage provided to their respective systems 100, 200, each of the systems 100, 200 can be controlled to provide only their pre-determined share/percentage of the load current/power with the percentage. The same control scheme can be extended for any number of parallel sources. The share of power to be handled by each of systems 100, 200 can established by specifying a percentage of the load current within the respective controllers 118, 218 up to the rated current of each system 100, 200. For example, if there are two identical independent DC power systems 100, 200 with each rated at 100 A and the total load is 100 A, the share percentage will be determined to be 50% for each independent DC power system 100, 200. In another example, consider the situation of three independent DC power systems connected in parallel wherein two of the independent DC power systems are twice as powerful as the third independent DC power system. In this situation, the percentage share of the load current for each of the twice as powerful independent DC power systems would be 40% (e.g., a total of 80%), while the less power third independent DC power system would provide 20% of the load current.

More specifically, each of the controllers 118, 218 operates to regulate the voltage of the DC bus 220 to provide each of the respective independent DC power systems 100, 200 with a reference voltage V* that will produce only the pre-determined percentage share of the load current. The reference voltage, V*, for each of the controllers 118, 218 follows the equation:

$$V^* = V_{ref}\frac{1}{1-K}\left(1 - K\frac{I_{actual}V_{rated}}{V_{ref}I_{rated}}\right) \quad (1)$$

Where: $V_{REF}$=the desired output voltage specified by the user/operator for the respective independent DC power system;
$I_{actual}$=the actual current of the respective independent DC power system delivered to the load;
$V_{Rated}$=the rated voltage of the respective of the independent DC power system;
$I_{Rated}$=The rated current of the respective independent DC power system.

Based on the voltage equations above, the actual current provided to the load by each of the independent DC power systems 100, 200 can be calculated as follows:

$$I_{actual1} = \frac{\frac{1}{1-K}V_{ref} - V_L}{r_1 + \frac{KV_{rated}}{1-KI_{rated}}} \quad (2)$$

Where: $I_{actual1}$=the actual current of the respective independent DC power system delivered to the load;
$V_{REF}$=the desired output voltage specified by the user/operator for the respective independent DC power system;
$V_L$=the voltage applied to the load;
$R_1$=the internal resistance of the respective independent DC power system;

$V_{Rated1}$=the rated voltage of the respective independent DC power system;

$I_{Rated1}$=the rated current of the respective independent DC power system.

A key parameter in equations (1)-(4) above is the K factor, which, in certain embodiments is the same for each of the independent DC power system 100, 200. In other embodiments, the K factor is different for each of the independent DC power systems 100, 200. The K factor is programmed into each respective controller 118, 218 and can be tuned to a value between 0 and 1 to regulate the bus voltage to a desired reference voltage that will provide the assigned percentage of power to the load. In general, when K is zero, the DC bus voltage is regulated perfectly to the desired reference voltage, however, the first and second independent DC power systems 100, 200 may not have the desired power sharing. The more K is increased, the better the power sharing between the first and second independent DC power systems 100, 200, however, the voltage regulation may be slightly compromised by a few percentage points. In actuality, the perfect value for K depends on the operating parameters and characteristics of each of the independent DC power systems 100, 200. For example, the greater similarity in operating parameters and characteristics between the first and second independent DC power systems 100, 200, the smaller K factor is needed and better voltage regulation is being achieved. However, if the first and second independent DC power systems 100, 200 have very different operating parameters and characteristics, the K factor needs to be closer to one to achieve the desired power sharing with the knowledge that DC bus voltage regulation by one or both of the controllers 118, 218 will not be exact. In certain embodiments, the K factor is tuned through operational iterations in a manner similar to tuning other controller parameters. In certain embodiments, the K factor is simply input into the respective controller 118, 218 without tuning. For example, a K factor of 0.3 (e.g., 30%) for each of controllers 118, 218 has been found to produce a desirable comprise in power sharing and DC bus voltage regulation for independent DC power systems 100, 200.

In operation, each controller 118, 218 knows the rated voltage and rated current (which determine the power rating) for its respective power system 100,200. Further, each controller 118, 218, knows the nominal reference DC voltage, $V_{ref}$, (e.g., the DC voltage set point) that the respective DC power system 100, 200 is to supply. In certain embodiments, each of the controllers 118, 218 is provided with the same DC voltage set point for their respective DC power systems 100, 200, while in other embodiments the controllers 118, 218 can be provided with different DC voltage set points. Each controller 118, 218 is additionally provided with the K factor value for their respective DC power systems 100, 200. In certain embodiments, each of the controllers 118, 218 is provided by with the same K factor value, while in other embodiments each of the controllers 118, 218 can be provided with different K factor values. In a preferred embodiment, all controllers have the same rated voltage, the same DC voltage set point and the same K factor value. Further, in a preferred embodiment, each controller has its own rated current, which is directly related to the power rating of the DC power system that it is controlling.

Referring once again to the physical circuit of FIG. 2, it should be noted that without the method disclosed herein the current $I_{actual1}$ would follow the equation:

$$I_{actual1} = \frac{V_{ref} - V_L}{r_1}. \quad (3)$$

And, considering that $r_1$ and $r_2$ are very small, a slight mismatch between them would cause a large discrepancy between $I_{actual1}$ and $I_{actual2}$. However, the utilizing the method disclosed herein, equation (1) can be programmed into each of the respective controllers to help minimize the discrepancy. As noted above the current resulting from equation (1) is found in equation (2) wherein the denominator of the equation includes a term in addition to $r_1$ $$\left(\text{e.g., denominator} = r_1 + \frac{K}{1-K}\frac{V_{rated}}{I_{rated}}\right).$$

The additional term behaves like a virtual resistor. For example, consider the physical circuit wherein $r_1$=0.001 and $r_2$=0.002 such that $r_2$=2$r_1$, $I_1$=2$I_2$. Utilizing the method disclosed herein, treating the additional term of the denominator as a virtual resistor and setting it equal to, for example, 10, the resulting effective resistance would be $r_{EF1}$=10.001 and $r_{EF2}$=10.002 and the resulting currents of $I_1$ and $I_2$ would be essentially the same.

Figure 3:
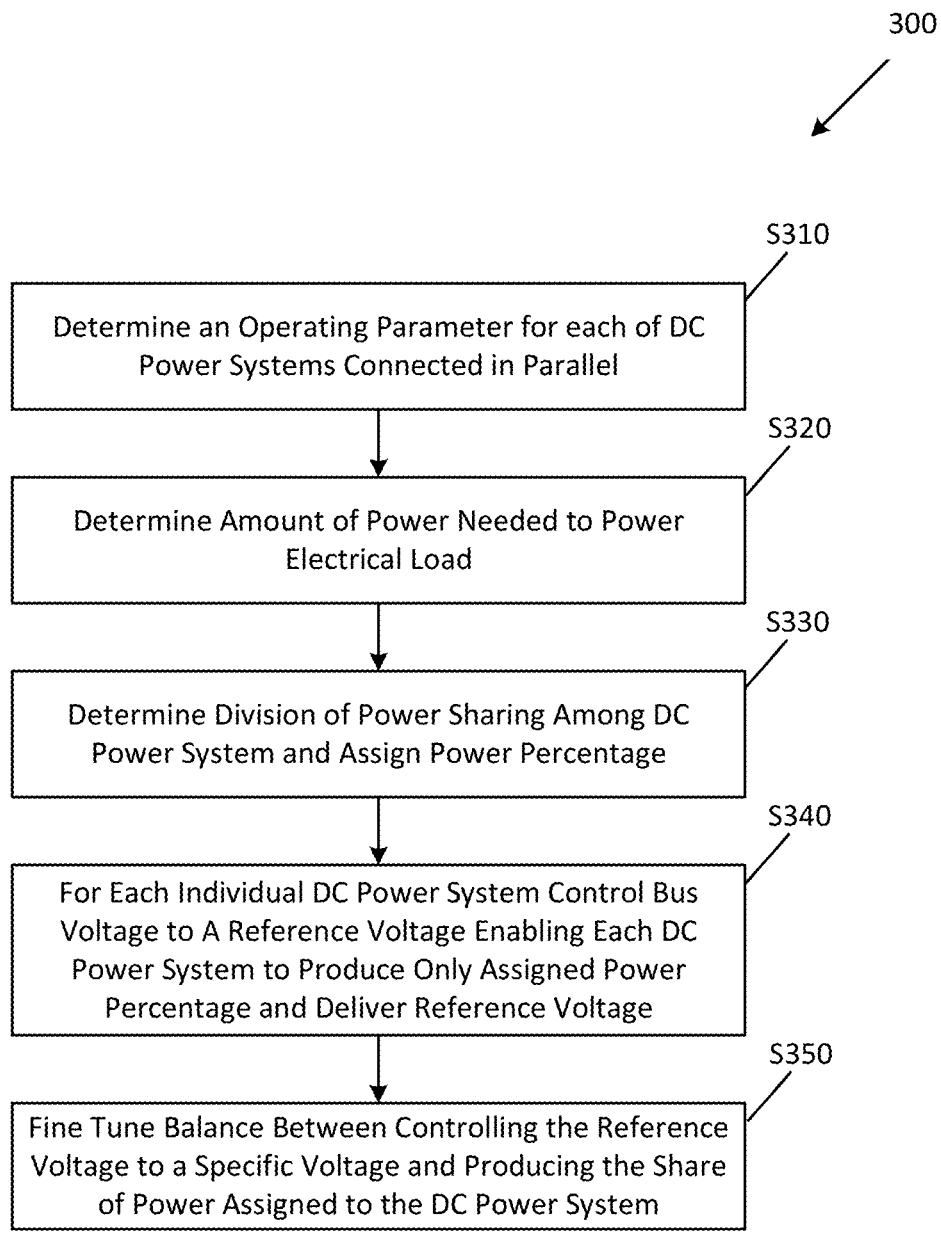
FIG. 3 is a method for controlling power sharing among parallel DC sources.

Referring to FIG. 3, a method 300 for sharing power among parallel independent DC power systems (e.g., independent DC power systems 100, 200), wherein each system is controlled by an independent controller (e.g., controllers 118, 218) and all independent controllers are connected to a common DC bus (e.g., DC bus 220). The method 300 includes determining one or more operating parameters of each of the independent DC power systems connected in parallel, S310. In certain embodiments, the one or more operating parameters include a rated current, a rated voltage, and/or a power rating for each of the independent DC power systems. It should be noted that the DC power systems connected in parallel may have different current or power ratings. However, the output voltage rating of each of the DC power systems should be the same. If the output voltage ratings for each of the DC power systems are not the same, all of the DC power systems should operate at a voltage equal to the minimum rating voltage, which may lead to lower efficiency.

The method 300 additionally includes determining the amount of power, or load current, necessary to power a specific electrical load, S320, as well as determining a division of power sharing among the parallel independent DC power systems, S330. The division of power sharing is based on both the power needed to power the load and the one or more operating parameters of each of the independent DC power systems. Once a division of power sharing (e.g., a percentage of power to supply to the load) is determined and assigned, the method 300 includes, for each independent DC power system, supplying a reference voltage to the respective independent DC power system to produce only the respective share of power (±a small variation in range as noted herein), S340. In certain embodiments, the method 300 additionally includes controlling the respective share of power produced by the respective independent DC power system in accordance with a K factor, S350. The K factor comprises a changeable parameter that provides a fine tuning balance between controlling the reference voltage to a specific voltage and producing the share of power assigned to a respective one of the independent DC power systems.

The power sharing control scheme utilized in the systems, devices and methods disclosed herein employs an algebraic equation (e.g., Equation (1)) to estimate the reference voltage and, hence, operation of the power sharing control scheme is instantaneous. Notably, the power sharing control scheme is not slowed by a communication delay or by a time constant that is associated with any controller or any filter-based approach. While it is possible that a sudden load change can cause a disturbance (e.g., a delay) in operation of the power sharing control scheme, the disturbance is due to the nature of the controller (e.g., a controller, such as controller 118, 218, controlling with a cascaded inner current loop and outer voltage loop) rather than due to a delay introduced by the power sharing control scheme.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A system for controlling power sharing among DC power systems connected in parallel and powering an electrical load, the system comprising:
   a first DC power system controlled by a first controller;
   a second DC power system controlled by a second controller distinct from the first controller, the second controller sharing a DC bus with the first controller; and
   an electrical load powered by the first DC power system and the second DC power system, wherein the first and second DC power systems are connected in parallel, and wherein each of the first and second DC power systems are assigned a percentage of power to produce to power the electrical load, and
   wherein the first controller supplies a first reference voltage to the first DC power system, the first reference voltage being used by the first DC power system to produce only the percentage of power assigned to the first DC power system, and
   wherein the second controller supplies a second reference voltage to the second DC power system, the second reference voltage being used by the second DC power system to produce only the percentage of power assigned to the second DC power system.

2. The system of claim 1, wherein the electrical load comprises one or more elements of an electrical system of an aircraft.

3. The system of claim 1, wherein the percentage of power assigned to each of the first DC power system and the second DC power system is based on both one or more operating parameters of the respective first and second DC power systems and an amount of power needed to power the electrical load.

4. The system of claim 3, wherein the one or more operating parameters of the respective DC power systems comprises one or more of a rated voltage and a rated current.

5. The system of claim 1, wherein the first controller utilizes a first variable operating parameter to fine tune a balance between controlling the first reference voltage to a specific first voltage and producing the percentage of power assigned to the first DC power system.

6. The system of claim 5, wherein the second controller utilizes a second variable operating parameter to fine tune a balance between controlling the second reference voltage to a specific second voltage and producing the percentage of power assigned to the second DC power system.

7. A system for controlling power sharing among DC power systems connected in parallel and powering an electrical load, the system comprising:
   a first DC power system controlled by a first controller;
   a second DC power system controlled by a second controller distinct from the first controller, the second controller sharing a DC bus with the first controller; and
   an electrical load powered by the first DC power system and the second DC power system, wherein the first and second DC power systems are connected in parallel, and wherein each of the first and second DC power systems are assigned a percentage of power to produce to power the electrical load, and
   wherein the first controller supplies a first reference voltage to the first DC power system, the first reference voltage being used by the first DC power system to produce the percentage of power assigned to the first DC power system, and
   wherein the second controller supplies a second reference voltage to the second DC power system, the second reference voltage being used by the second DC power system to produce the percentage of power assigned to the second DC power system.

8. The system of claim 7, wherein the electrical load comprises one or more elements of an electrical system of an aircraft.

9. The system of claim 7, wherein the percentage of power assigned to each of the first DC power system and the second DC power system is based on both one or more operating parameters of the respective first and second DC power systems and an amount of power needed to power the electrical load.

10. The system of claim 9, wherein the one or more operating parameters of the respective DC power systems comprises one or more of a rated voltage and a rated current.

11. The system of claim 7, wherein the first controller utilizes a first variable operating parameter to fine tune a balance between controlling the first reference voltage to a specific first voltage and producing the percentage of power assigned to the first DC power system.

12. The system of claim 11, wherein the second controller utilizes a second variable operating parameter to fine tune a balance between controlling the second reference voltage to a specific second voltage and producing the percentage of power assigned to the second DC power system.

13. A method of controlling power sharing among the first DC power system and second DC power system of claim 7, the method comprising:
   determining an operating parameter of each of the first DC power system and the second DC power system;
   determining an amount of power needed to power the electrical load;
   determining a division of power among the first DC power system and the second DC power system, wherein determining the division of power is based on the operating parameter of the respective first DC power system and the second DC power system and wherein determining the division of power is additionally based on the amount of power needed to power the electrical load;
   assigning a percentage of power to produce at each of the first DC power system and the second DC power system, the percentage based on the division of power;

independently supplying the first reference voltage to the first DC power system at a voltage level that enables the first DC power system to produce the percentage of power assigned to the first DC power system; and independently supplying the second reference voltage to the second DC power system at a voltage level that enables the second DC power system to produce the percentage of power assigned to the second DC power system.

* * * * *